Feb. 16, 1943.  C. L. BEAN  2,310,923
SHAFT BEARING
Filed Oct. 2, 1941
Figure 1
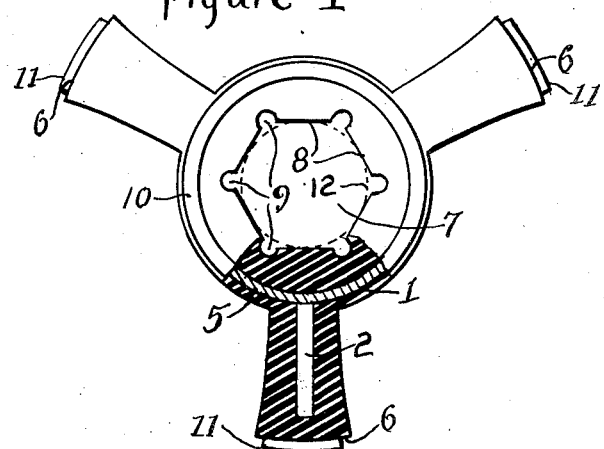
Figure 2
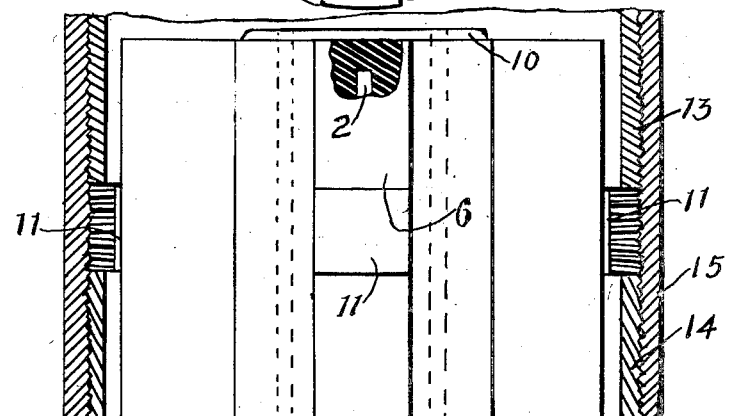
Figure 3
Figure 4
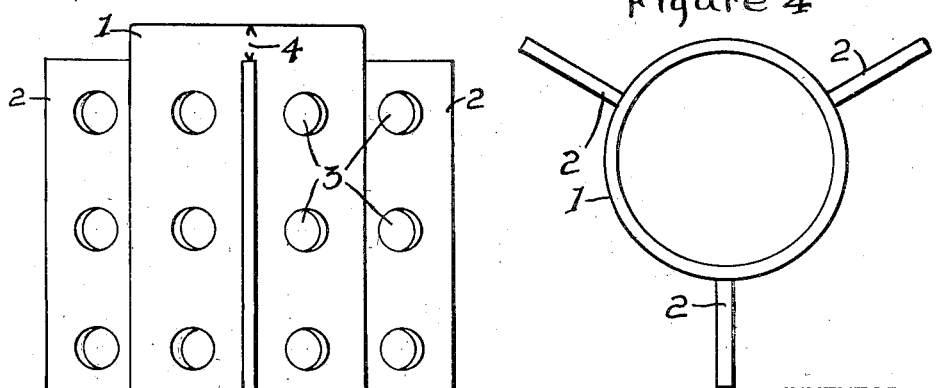
INVENTOR
Charles L. Bean
BY John A. Naismith
ATTORNEY Patented Feb. 16, 1943

2,310,923

UNITED STATES PATENT OFFICE 2,310,923

SHAFT BEARING

Charles L. Bean, San Jose, Calif.

Application October 2, 1941, Serial No. 413,283

6 Claims. (Cl. 308—238)

The present invention relates particularly to a bearing and support for a water-lubricated deep-well turbine pump shaft, and its description will be confined to its operation in connection with such a shaft, although other uses will readily appear.

Rubber bearings for the type of service indicated have heretofore consisted of a metal spider having a rubber wear-ring or member mounted rather loosely therein to encompass the shaft passing therethrough. But such a construction has failed to meet the requirements of the art in many ways, among which may be mentioned the following: The metal of the spider is exposed to the water and air alternately and more or less rapidly corrodes. It is also subjected to the electrolytic action of mineral bearing waters, and is destroyed thereby. The metal of the spider legs contacts the metal of the pipe in which it is mounted, providing a point on the casing or pipe where corrosion is accelerated. Such spiders or bearings can only be mounted satisfactorily between the opposing ends of pipe sections.

It is therefore, one object of the present invention to provide a bearing of the character indicated wherein form and strength is obtained by the use of a metal spider, and wherein permanency is assured by completely enveloping the metal spider with a suitable waterproof material.

It is another object to provide a device of the character indicated constructed and arranged in such a manner that it may be mounted between the opposing ends of pipe sections, or at any point intermediate the ends of a pipe section.

It is still another object to provide a device of the character indicated provided with means to facilitate the prelubrication thereof, and constructed and arranged to permit the unobstructed passage of sand, gravel, and other foreign matter therethrough without contacting the wearing surface.

Finally, it is an object to provide a device of the character indicated that will be sufficiently light in weight to remain at any point in the casing at which it may be placed.

In the drawing:

Figure 1 is a top plan view of a device embodying my invention, partly in section.

Figure 2 is a side elevation of the same, partly in section and in position in a pipe column.

Figure 3 is a side elevation of the metal spider upon which the device is built.

Figure 4 is a top plan view of the same.

In constructing my improved bearing I first provide a short metal tube as 1, and mount thereon three metal webs as 2. Each web 2 consists of a plate lying in a radial plane coinciding with the axis of the tube. The tube 1 is somewhat larger in diameter than the shaft about which it is to be placed, and the width of webs 2 is somewhat less than the distance between the tube 1 and the pipe in which the device is to be placed. The tube and webs are pierced with a number of holes as 3 whereby the enveloping rubber may be securely anchored thereto, and the webs 2 are somewhat shorter than the tube 1, at each end, as shown at 4.

About the entire metal spider 1—2 is molded a one-piece envelope of live rubber having the following characteristics. It covers the outer surface of the tube 1 rather thinly as indicated at 5, both side and ends. It is considerably thicker at the base of the webs 2 and increases in thickness toward and beyond the outer edge of the webs where it terminates in a wide arcuate surface 6 which bears against the casing in which it is placed. That portion of the rubber envelope on the inside of the tube 1 has a hole 7 formed therethrough in concentric relation to the tube, and of a size to form a bearing for a given size shaft. In the present instance the hole is bounded by six flat sides as at 8, a channel as 9 being formed in the angle formed by each two sides. The tube 1 is slightly longer than the main body of the member and therefore forms an annulus as 10 on each end of the same.

On the central portion of the surface 6 of each web is formed a boss 11.

A device formed as above described presents no exposed metal whatever, when in use, and consequently does not deteriorate through corrosion and other causes. Sand and other water borne material can flow freely through the channels 9 without deleterious effect on the shaft, shown in dotted lines at 12.

In starting the rotation of a shaft in a rubber bearing it is necessary to lubricate the contacted surface with water, or other liquid. The recesses formed by the rings 10, that is, whichever recess is uppermost, confines the liquid around the shaft and causes it to flow in the desired direction.

When the bearing is to be used it is simply slipped into position on the shaft. The two pipe sections 13 and 14 bear against the bosses 11, the coupling for the pipe sections being indicated at 15. When it is desired to place the bearing at some intermediate point in the length of a pipe section, then the bosses 11 are removed, but the bearing will stay at the point at which it is placed because it is light in weight and the surfaces 6 are sufficiently large, and the rubber sufficiently resilient to bear against the pipe surface and hold it there.

Although but one specific embodiment of the invention has been herein illustrated and described, it will be understood that various alterations in the details of construction may be made without departing from the scope of the invention as indicated in the appended claims.

I claim:

1. A shaft bearing for a well pipe comprising, a one piece foundation member consisting of a metal tube having radially directed webs projecting outwardly from its exterior surface and extending lengthwise thereof, and an envelope of resilient rubber for said member, the envelope portion for the webs extending outwardly beyond their outer edges to contact the well pipe and having their outer edges wider than their bases to form arcuate surfaces corresponding to the curvature of the pipe, said envelope having a passage formed axially therethrough to receive a rotating shaft.

2. A shaft bearing for a well pipe comprising, a one piece foundation member consisting of a metal tube having radially directed webs projecting outwardly from its exterior surface, and an envelope of resilient rubber for said member, and bosses formed on the outer surfaces of the envelope portions on the webs and disposed midway the length thereof to receive the opposing ends of the well pipe sections.

3. A shaft bearing for a well pipe comprising, a one piece foundation member consisting of a metal tube having radially directed webs projecting outwardly from its exterior surface and extending lengthwise thereof, and an envelope of resilient rubber for said member, the envelope portions for the webs extending outwardly beyond the webs' outer edges to contact the well pipe and having their outer surfaces wider than their bases to form arcuate surfaces corresponding to the curvatures of the pipe, and having bosses formed on said outer surfaces midway their length to receiving the opposing ends of the well pipe sections.

4. A shaft bearing comprising, a one-piece foundation member consisting of a metal tube having radially directed webs projecting outwardly from its exterior surface, and an envelope of resilient rubber for said member, said envelope having a passage formed axially therethrough to receive a rotating shaft, and the uppermost end of said envelope when in an operative position having an annulus formed thereon in concentric relation with said tube whereby liquid poured within the confines thereof will be caused to flow centrally to said passage.

5. A shaft bearing comprising, a one-piece foundation member consisting of a metal tube having radially directed webs projecting outwardly from its exterior surface and extending lengthwise thereof, and an envelope of resilient rubber for said member, said envelope having a passage formed axially therethrough to receive a rotating shaft, the wall of said passage having channels formed longitudinally therein and extending from end to end thereof, and the uppermost end of said bearing member when in use having an annulus formed thereon in concentric relation with said tube whereby liquid poured within the confines of the annulus will be directed inwardly to flow through said channels.

6. A shaft bearing for a well pipe comprising, a one piece foundation member consisting of a metal tube having radially directed webs projecting outwardly from its exterior surface a distance less than the distance between said member and the pipe in which it is placed and extending lengthwise of said member, and an envelope of resilient rubber for said member, the envelope portion for the webs extending outwardly beyond their outer edges to contact the well pipe, and said envelope having a passage formed axially therethrough to receive a rotating shaft.

CHARLES L. BEAN.